United States Patent [19]

Bühler et al.

[11] Patent Number: 5,425,785
[45] Date of Patent: Jun. 20, 1995

[54] PROCESS FOR DYEING POLYESTER AND POLYESTER-CONTAINING TEXTILE MATERIALS

[75] Inventors: Ulrich Bühler; Ralf Zerrer, both of Alzenau, Germany

[73] Assignee: Hoechst Mitsubishi Kasei Co., Tokyo, Japan

[21] Appl. No.: 291,864

[22] Filed: Aug. 17, 1994

[30] Foreign Application Priority Data

Aug. 28, 1993 [DE] Germany ............... 43 29 026.4

[51] Int. Cl.$^6$ .................. C09B 29/42; D06P 1/18; D06P 3/54; D06P 3/87
[52] U.S. Cl. ............................. 8/639; 8/532; 8/533; 8/922; 8/923; 8/662; 8/934; 534/772
[58] Field of Search ............... 8/532, 533, 922, 933, 8/934, 662, 639; 534/772

[56] References Cited

U.S. PATENT DOCUMENTS

| | | | |
|---|---|---|---|
| 5,019,133 | 5/1991 | Himeno et al. | 8/531 |
| 5,151,506 | 9/1992 | Bach et al. | 534/772 |

FOREIGN PATENT DOCUMENTS

| | | |
|---|---|---|
| 0302401 | 2/1989 | European Pat. Off. |
| 2160583 | 6/1973 | France. |
| 2157229 | 5/1973 | Germany. |
| 4131845 | 6/1993 | Germany. |
| 1360749 | 7/1974 | United Kingdom. |

OTHER PUBLICATIONS

Trotman, E. R. Dyeing and Chemical Technology of Fibres, 6th edition, 1984, pp. 489–490.

*Primary Examiner*—Paul Lieberman
*Assistant Examiner*—Margaret Einsmann
*Attorney, Agent, or Firm*—Connolly & Hutz

[57] ABSTRACT

The present invention relates to a process for dyeing polyester or polyester-containing textile materials at pH 8 to pH 11 with one or more monoazo dyestuffs of the general formula I

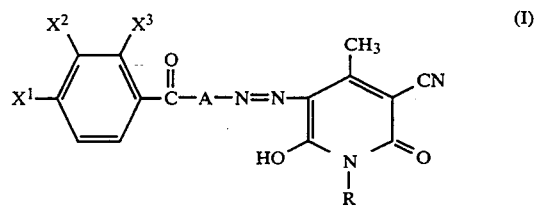

in which A, R and $X^1$ to $X^3$ are as defined in claim 1.

17 Claims, No Drawings

PROCESS FOR DYEING POLYESTER AND POLYESTER-CONTAINING TEXTILE MATERIALS

The present invention relates to a process for dyeing textile polyester or polyester-containing textile materials with hydroxypyridoneazo dyestuffs.

Textile polyester or polyester-containing textile materials are usually dyed with disperse dyestuffs from an aqueous dyebath at HT conditions in a temperature range from 120° to 140° C. and at pH values from 4 to 6, since the disperse dyestuffs are destroyed completely or in part at higher pH values. Accordingly, higher pH values result in losses in colour strength and shifts in hue during dyeing, so that the dyeings are not reproducible. Before dyeing, the polyester fibre is usually subjected in a separate step to alkaline rinsing treatment in order to remove auxiliaries which have been used during weaving or spinning of the fibre. Examples of these auxiliaries are oiling or sizing agents which when present would make level dyeing of the polyester fibre difficult or impossible. Another reason for carrying out the alkaline treatment is to destroy oligomers of the polyester fibre which during the dyeing process have emerged from the interior of the fibre and give the dyeing an unlevel appearance and to keep them in the aqueous dyeing liquor. The oligomers mentioned are undesirable in particular in yarn dyeing, since during spinning of the dyed yarns these oligomers are deposited in the spinning apparatuses in those places where the yarn is deflected in the form of powders as a result of abrasion. This results in soiling of the apparatus and causes the yarn to break.

This alkaline rinsing treatment is advantageously carried out at elevated temperature. To save time and energy and to reduce the number of apparatuses required for the two processes, alkaline pretreatment and dyeing, it has always been the goal to combine both processes in a single-bath rinsing and dyeing process. However, in order to achieve this goal, it is necessary to develop processes which produce reproducible dyeings in the aqueous dyebath at pH 8 to pH 11.

Polyester/cellulose or polyester/polyamide blend fabrics are usually dyed with dispersed and reactive dyestuffs from an aqueous dyeing bath in two dyeing steps. As mentioned above, the disperse dyestuffs are applied to the polyester portion at pH 4 to 6 and the reactive dyestuffs to the cellulose or polyamide portion in a pH range between pH 11 and 13. Here, too, the goal has been in the past to develop a single-bath application process for both classes of dyes. To this end, there has been a search for reactive dyestuffs which make it possible to dye at pH values between 8 and 11 and in this case, too, processes were required which ensure that under these conditions the polyester portion can be reproducibly dyed with disperse dyestuffs. DE-A-3,938,631 (corresponding to U.S. Pat. No. 5,019,133) describes a method for dealing with the defects of previous processes in which disperse dyestuffs are used for dyeing in the pH range between pH 8 and 10 in the presence of at least one amino acid which may be substituted on the nitrogen and/or an alkali metal salt of an amino acid which may be substituted on the nitrogen. However, this process when used for producing yellow dyeings by means of the commercially available hydroxypyridoneazo dyestuffs does not give satisfactory results but results in losses in colour strength and brilliance. The reason for this is that hydroxypyridoneazo dyestuffs, in particular the ones described in DE-A 2,001,821 and DE-A 3,120,747, are, as a result of their acidified hydroxyl groups, too sensitive to alkali. This is already apparent from the fact that various hydroxypyridoneazo dyestuffs are recommended as being highly suitable for alkaline discharge printing. In alkaline discharge printing, the dyestuff is destroyed in the areas where it is applied to the fabric to be printed and is contacted with alkali prior to fixation and is not capable of dyeing the fabric in these areas.

Accordingly, the object of the present invention is to provide alkali-resistant dyestuffs which produce good-quality yellow dyeings in a reproducible manner and without any uneconomical excess use of dyestuff or unecologically higher pollution of the dye house effluent due to hydrolyzed dyestuffs.

Surprisingly, it has now been found that selected hydroxypyridoneazo dyestuffs achieve this object. These hydroxypyridoneazo dyestuffs are already disclosed in part in DE-A 2,157,229, DE-A 3,927,069, DE-A 4,131,845 and EP-A 302,401, without, however, their particular suitability for alkaline dyeing being disclosed therein or obvious therefrom.

Accordingly, the invention provides a process for dyeing polyester or polyester-containing textile materials at pH 8 to pH 11, characterized in that there are used one or more monoazo dyestuffs of the general formula I

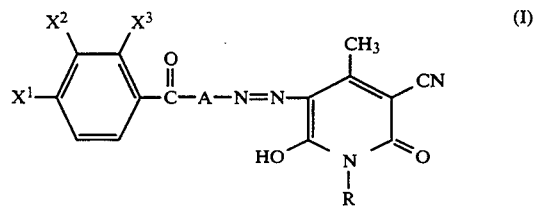

in which

A denotes 1,4-phenylene or 1,3-phenylene;

R denotes linear $(C_1-C_6)$-alkyl or $(C_1-C_4)$-alkoxy-$(C_2-C_4)$-alkyl;

$X^1$ denotes hydrogen or $(C_1-C_4)$-alkyl; and $X^2$ and $X^3$, independently of one another, denote hydrogen or methyl.

Unless expressly stated otherwise, alkyl radicals can be linear or branched. Examples are methyl, ethyl, n-propyl, i-propyl, n-butyl, i-butyl, n-pentyl and n-hexyl. Examples of alkoxyalkyl groups as R are 2-methoxy-, 2-ethoxy-, 2-n-propoxy-, 2-i-propoxy-, 2-n-butoxy- and 2-i-butoxyethyl, 3-methoxy-, 3-ethoxy-, 3-n-propoxy-, 3-i-propoxy-, 3-n-butoxy- and 3-i-butoxypropyl, 2-methoxypropyl and 4-methoxy- and 4-ethoxybutyl.

The process according to the invention is preferably carried out with dyestuffs of the general formula I in which A represents 1,4-phenylene.

Preference is also given to dyestuffs in which R denotes ethyl, n-propyl or n-butyl.

With respect to radicals $X^1$ to $X^3$, preference is given to those dyestuffs in which $X^1$ and one of the radicals $X^2$ and $X^3$ denote methyl and to those in which $X^2$ and $X^3$ represent hydrogen and $X^1$ represents ethyl or, in particular, i-propyl.

Further preference is given to dyestuffs in which the sum of carbon atoms in the radicals R and $X^1$ to $X^3$ is 4 to 7.

Dyestuffs of the general formula I exhibiting a plurality of the abovementioned preferred features are used particularly preferably.

The present invention also provides monoazo dyestuffs of the general formula Ia

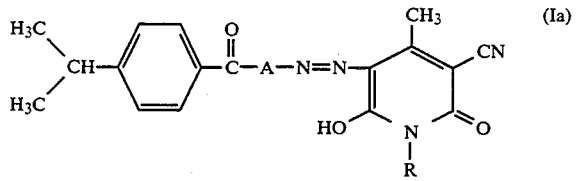

in which

A denotes 1,4-phenylene or 1,3-phenylene and
R denotes ethyl, n-propyl or n-butyl.

The dyestuffs of the general formula Ia have not yet been disclosed and are superior to the structurally most closely related compounds of the prior art with respect to their colouristic properties.

In preferred dyestuffs of the general formula Ia, A represents 1,3-phenylene.

The dyestuffs of the general formula Ia can be prepared by the methods described in the abovementioned prior art. They can be prepared in particular by diazotizing an amine of the general formula IV

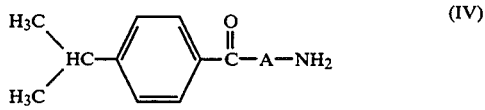

in which A is as defined above in a manner known per se and coupling the resulting diazonium salt on to a hydroxypyridone of the general formula V

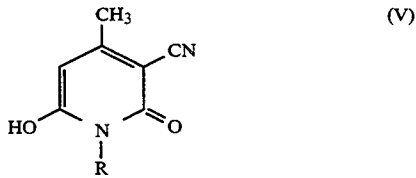

in which R is as defined above.

The process according to the invention can be carried out with a single dyestuff of the general formula I or Ia. However, it can also be carried out with two or more dyestuffs of the general formula I or Ia, preference being given, however, to two dyestuffs. The proportion of any one dyestuff is in these cases preferably 5 to 80% by weight, particularly preferably 20 to 50% by weight, in each case relative to the total amount of dyestuff.

The process according to the invention is preferably carried out under HT conditions, i.e. in an aqueous dyeing liquor at temperatures of between 120° C. and 140° C. in a dyeing autoclave. The pH is preferably 9 to 10. The dyestuffs of the general formula I and/or Ia according to the invention can be used not only in the process according to the invention but also in other customary processes for dyeing and printing hydrophobic synthetic textile materials, for example under HT conditions in the pH range between 4 and 11, in the so-called thermosol process, or else be applied to the fibre by a printing process.

The polyesters to be dyed by the process according to the invention are in particular those based on polyethylene glycol terephthalates. Examples of polyester-containing textile materials are polyester/polyamide blends.

In the process according to the invention, the dyestuffs or dyestuff mixtures are used in fine dispersion. Fine dispersion of the dyestuffs is effected in a manner known per se by slurrying the as-synthesized dyestuff together with dispersing agents in a liquid medium, preferably in water, and subjecting the resulting mixture to the action of shearing forces, the dyestuff particles originally present being mechanically comminuted to such an extent that an optimum specific surface area is obtained and minimum sedimentation of the dyestuff occurs. The particle sizes of the dyestuffs are in general between 0.5 and 5 $\mu$m, preferably about 1 $\mu$m.

The dispersing agents used in the milling process can be nonionic or anionic. Examples of nonionic dispersing agents are reaction products of alkylene oxides, such as, for example, ethylene oxide or propylene oxide, with alkylatable compounds, such as, for example, fatty alcohols, fatty amines, fatty acids, phenols, alkylphenols and carboxylates. Examples of anionic dispersing agents are lignosulphonates, alkyl sulphonates or alkylaryl sulphonates or alkylaryl polyglycol ether sulphonates.

For most application methods, the dyestuff preparations thus obtained should be pourable. Therefore, the dyestuff content and dispersing agent content is limited in these cases. In general, the dispersions are adjusted to a dyestuff content of up to 25% by weight and a dispersing agent content of up to about 25%. For economic reasons, the dyestuff content does not fall below 15% by weight in most cases.

The dispersions can contain further auxiliaries, for example those acting as oxidizing agents, such as, for example, sodium m-nitrobenzenesulphonate, or fungicides, such as, for example, sodium o-phenylphenoxide.

For certain application areas, powder preparations are preferred. These powders contain the dyestuff or the dyestuff mixture, dispersing agents and other auxiliaries, such as, for example, wetting agents, oxidizing agents, preservatives and dustproofing agents.

A preferred preparation method for pulverulent dyestuff preparations is to remove the liquid from the liquid dyestuff dispersions described above, for example by vacuum-drying, freeze-drying, drying on drum dryers but preferably by spray-drying.

The dyeing liquors are prepared by diluting the required amounts of dyestuff preparations produced by the above procedure with the dyeing medium, preferably with water, until a liquor ratio of 5:1 to 50:1 is obtained for dyeing. In addition, further dyeing auxiliaries, such as dispersing agents, wetting agents and fixation auxiliaries, are usually added to the liquors.

The pH of the dyeing liquor is adjusted to the required value before and also during dyeing by addition of bases, such as alkali metal hydroxides, for example aqueous sodium hydroxide solution, alkali metal bicarbonates, for example sodium bicarbonate, or alkali metal carbonates, for example sodium carbonate.

In order to minimize the pH variations, it is preferred to add buffer substances such as described, for example, in JSDC 77 (1979), p. 47, or JSDC 79 (1981), p. 115. Particularly suitable buffer substances are those having their maximum buffering action in the pH range between 9 and 11. Examples of suitable buffering systems are acetic acid/sodium pyrophosphate, boric acid/borax, sodium dihydrogen phosphate/disodium hydrogen phosphate, phosphoric acid/succinic acid/boric acid or combinations of organic phosphorus compounds with polycarboxylic acids. The amounts used of the buffering system are preferably between 0.5 and 10 g/l.

EXAMPLE 1

100 g of a polyethylene terephthalate fabric are dyed in a dyeing autoclave from a dyeing liquor consisting of 2 l of water, 2 g of a dyeing auxiliary based on a formaldehyde condensation product and 5 g of a buffering substance which is a mixture of an organic phosphorus compound with a polycarboxylic acid at 130° C. with 1.5 g of a 20% strength powder preparation of the dyestuff of the formula Ib

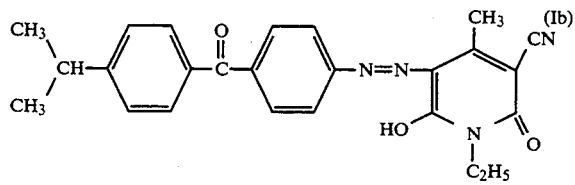

for 45 minutes after prior adjustment of the pH of the dyeing liquor to 9.5 with aqueous sodium hydroxide solution. The dyeing is then rinsed, reduction cleared, and rinsed and dried to give a yellow dyeing having a bright hue.

COMPARATIVE EXPERIMENT 1

The dyeing is repeated, except that now 4 g of sodium acetate are added as the buffering substance and the pH of the dyeing liquor is adjusted to 4.5 with acetic acid. The resulting dyeing is virtually identical with respect to colour strength and hue and virtually no decomposition of the dyestuff has taken place at pH 4.5.

COMPARATIVE EXPERIMENT 2

The dyeings at pH 9.5 and 4.5 described above are repeated, except that the dyestuff of the formula Ib is replaced by the dyestuff of the formula III

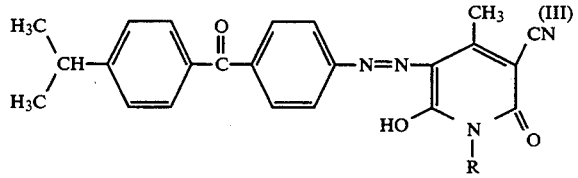

disclosed in DE-A 3,120,747. The depth of shade of the dyeing obtained at pH 9.5 is only about 70% of the depth of shade obtained at pH 4.5.

EXAMPLE 2

15 g of the dyestuff of the formula Ib are incorporated in fine dispersion in a printing paste containing 45 g of carob seed flour, 6 g of sodium 3-nitrobenzenesulphonic acid and 3 g of citric acid per 100 g. If polyester is printed with this printing paste, the printed fabric, after drying, is steamed at 1.5 atmospheres gauge steam pressure for 15 minutes, soaped, rinsed and dried, a strong yellow print having excellent fastness properties is obtained.

Table 1 below lists further dyestuffs of the general formula Ia according to the invention which can be used analogously to the above Examples 1 and 2:

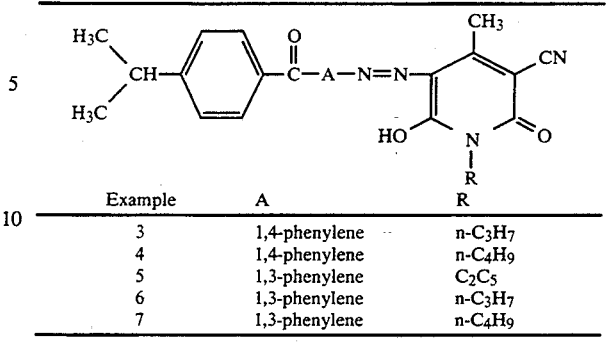

| Example | A | R |
|---|---|---|
| 3 | 1,4-phenylene | n-$C_3H_7$ |
| 4 | 1,4-phenylene | n-$C_4H_9$ |
| 5 | 1,3-phenylene | $C_2C_5$ |
| 6 | 1,3-phenylene | n-$C_3H_7$ |
| 7 | 1,3-phenylene | n-$C_4H_9$ |

Table 2 below lists further dyestuffs of the general formula I which can be used for the process according to the invention analogously to Example 1:

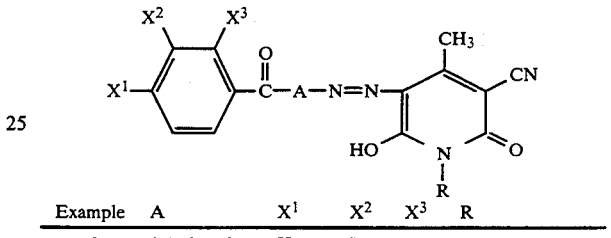

| Example | A | $X^1$ | $X^2$ | $X^3$ | R |
|---|---|---|---|---|---|
| 8 | 1,4-phenylene | H | H | H | n-$C_4H_9$ |
| 9 | 1,4-phenylene | H | H | H | $C_2H_5$ |
| 10 | 1,4-phenylene | H | H | H | n-$C_6H_{13}$ |
| 11 | 1,4-phenylene | H | H | H | n-$C_5H_{11}$ |
| 12 | 1,3-phenylene | H | H | H | n-$C_4H_9$ |
| 13 | 1,3-phenylene | H | H | H | $C_2H_5$ |
| 14 | 1,3-phenylene | H | H | H | $CH_3$ |
| 15 | 1,3-phenylene | H | H | H | n-$C_6H_{13}$ |
| 16 | 1,3-phenylene | H | H | H | n-$C_3H_7$ |
| 17 | 1,3-phenylene | $CH_3$ | H | H | $C_2H_5$ |
| 18 | 1,3-phenylene | $CH_3$ | H | H | n-$C_3H_7$ |
| 19 | 1,4-phenylene | $CH_3$ | H | H | $CH_3$ |
| 20 | 1,4-phenylene | $CH_3$ | H | H | $C_2H_5$ |
| 21 | 1,4-phenylene | $CH_3$ | H | H | n-$C_4H_9$ |
| 22 | 1,4-phenylene | $CH_3$ | H | H | n-$C_6H_{13}$ |
| 23 | 1,4-phenylene | H | $CH_3$ | H | n-$C_3H_7$ |
| 24 | 1,4-phenylene | H | H | $CH_3$ | $C_2H_5$ |
| 25 | 1,3-phenylene | H | H | $CH_3$ | n-$C_4H_9$ |
| 26 | 1,3-phenylene | $CH_3$ | $CH_3$ | H | $C_2H_5$ |
| 27 | 1,3-phenylene | $CH_3$ | $CH_3$ | H | n-$C_4H_9$ |
| 28 | 1,4-phenylene | $CH_3$ | $CH_3$ | H | $CH_3$ |
| 29 | 1,4-phenylene | $CH_3$ | $CH_3$ | H | $C_2H_5$ |
| 30 | 1,4-phenylene | $CH_3$ | $CH_3$ | H | n-$C_3H_7$ |
| 31 | 1,4-phenylene | $CH_3$ | $CH_3$ | H | n-$C_5H_{11}$ |
| 32 | 1,4-phenylene | $CH_3$ | H | $CH_3$ | n-$C_3H_7$ |
| 33 | 1,4-phenylene | $CH_3$ | H | $CH_3$ | n-$C_9H_{11}$ |
| 34 | 1,3-phenylene | $CH_3$ | H | $CH_3$ | $C_2H_5$ |
| 35 | 1,3-phenylene | $CH_3$ | H | $CH_3$ | n-$C_4H_9$ |
| 36 | 1,3-phenylene | $C_2H_5$ | H | H | $C_2H_5$ |
| 37 | 1,4-phenylene | $C_2H_5$ | H | H | $C_2H_5$ |
| 38 | 1,4-phenylene | $C_2H_5$ | H | H | n-$C_4H_9$ |
| 39 | 1,4-phenylene | $C_2H_5$ | $CH_3$ | H | $C_2H_5$ |
| 40 | 1,4-phenylene | $C_2H_5$ | H | $CH_3$ | n-$C_3H_7$ |
| 41 | 1,4-phenylene | n-$C_3H_7$ | H | H | $CH_3$ |
| 42 | 1,3-phenylene | n-$C_3H_7$ | H | H | n-$C_3H_7$ |
| 43 | 1,3-phenylene | i-$C_3H_7$ | H | H | $CH_3$ |
| 44 | 1,3-phenylene | i-$C_3H_7$ | H | H | $C_2H_5$ |
| 45 | 1,3-phenylene | i-$C_3H_7$ | H | H | n-$C_3H_7$ |
| 46 | 1,3-phenylene | i-$C_3H_7$ | H | H | n-$C_4H_9$ |
| 47 | 1,4-phenylene | i-$C_3H_2$ | H | H | $CH_3$ |
| 48 | 1,4-phenylene | i-$C_3H_7$ | H | H | n-$C_3H_7$ |
| 49 | 1,4-phenylene | i-$C_3H_2$ | H | H | n-$C_4H_9$ |
| 50 | 1,4-phenylene | i-$C_3H_7$ | H | H | n-$C_6H_{13}$ |
| 51 | 1,4-phenylene | i-$C_3H_7$ | H | H | $C_2H_5$ |
| 52 | 1,4-phenylene | i-$C_4H_9$ | H | H | $C_2H_5$ |
| 53 | 1,4-phenylene | n-$C_4H_9$ | H | H | n-$C_4H_9$ |
| 54 | 1,3-phenylene | i-$C_4H_9$ | H | H | $CH_3$ |
| 55 | 1,3-phenylene | H | H | H | $(CH_2)_2OnC_4H_9$ |
| 56 | 1,3-phenylene | H | H | H | $(CH_2)_3OnC_4H_9$ |

-continued

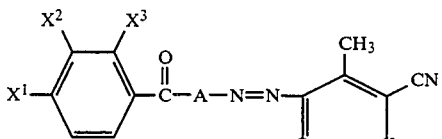

| Example | A | $X^1$ | $X^2$ | $X^3$ | R |
|---|---|---|---|---|---|
| 57 | 1,4-phenylene | H | H | H | $(CH_2)_2OCH_3$ |
| 58 | 1,4-phenylene | H | H | H | $(CH_2)_3OC_2H_5$ |
| 59 | 1,4-phenylene | $CH_3$ | H | H | $(CH_2)_3OCH_3$ |
| 60 | 1,4-phenylene | $CH_3$ | $CH_3$ | H | $(CH_2)_3OCH_3$ |
| 61 | 1,4-phenylene | $CH_3$ | H | $CH_3$ | $(CH_2)_3OC_2H_5$ |
| 62 | 1,3-phenylene | $CH_3$ | H | H | $(CH_2)_3OiC_3H_7$ |
| 63 | 1,3-phenylene | $CH_3$ | $CH_3$ | H | $(CH_2)_2OC_2H_5$ |
| 64 | 1,3-phenylene | $i\text{-}C_3H_7$ | H | H | $(CH_2)_2OC_2H_5$ |
| 65 | 1,4-phenylene | $i\text{-}C_3H_7$ | H | H | $(CH_2)_2OCH_3$ |
| 66 | 1,4-phenylene | $i\text{-}C_3H_7$ | H | H | $(CH_2)_3OCH_3$ |
| 67 | 1,4-phenylene | $i\text{-}C_3H_7$ | H | H | $(CH_2)_3OiC_3H_7$ |

We claim:

1. Process for dyeing polyester or polyester-containing textile materials consisting essentially of contacting one or more monoazo dyestuffs of the general formula I

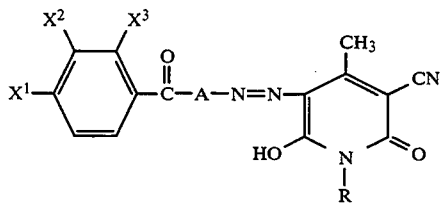

in which

A denotes 1,4-phenylene or 1,3-phenylene;

R denotes linear $(C_1-C_6)$-alkyl or $(C_1-C_6)$-alkoxy-$(C_2-C_4)$-alkyl;

$X^1$ denotes hydrogen or $(C_1-C_4)$-alkyl; and $X^2$ and $X^3$, independently of one another, denotes hydrogen or methyl; with said polyester or polyester-containing textile materials, and wherein said process is carried out in a pH range from 8 to 11 and a temperature range from 120° to 140° C.

2. The process according to claim 1, wherein A represents 1,4-phenylene.

3. The process according to claim 1, wherein R denotes ethyl, n-propyl or n-butyl.

4. The process according to claim 1, wherein $X^1$ is methyl and one of the radicals $X^2$ or $X^3$ is methyl.

5. The process according to claim 1, wherein $X^2$ and $X^3$ are hydrogen and $X^1$ is ethyl.

6. The process according to claim 2, wherein R is ethyl, n-propyl or n-butyl, $X^1$ is methyl and one of the radicals $X^2$ and $X^3$ is methyl.

7. The process according to claim 2, wherein R is ethyl, n-propyl or n-butyl; $X^2$ and $X^3$ are hydrogen and $X^1$ is i-propyl.

8. The process according to claim 1, wherein the sum of the carbon atoms in the radicals R, $X^1$, $X^2$ and $X^3$ are 4 to 7.

9. Process according to claim 1, wherein said process is carried out under HT conditions in an aqueous dyeing liquor at temperatures of between about 120° C. and about 140° C. in a dyeing autoclave.

10. The process according to claim 1, wherein the pH is about 9 to about 10.

11. The process according to claim 1, comprising two or more different dyestuff of formula I.

12. The process as claimed in claim 11, wherein the proportion of one dyestuff is from 5 to 80% by weight and the proportion of the other dyestuff is from 5 to 80% by weight relative to the total amount of the dyestuff.

13. The process according to claim 11, wherein the proportion of one dyestuff is from 20 to 50% by weight and the proportion of the other dyestuff is from 20 to 50% by weight relative to the total amount of the dyestuff.

14. The process as claimed in claim 1, wherein the dyestuffs or dyestuff mixtures are used in fine dispersion.

15. The process as claimed in claim 13, wherein the dyestuffs have a particle size between about 0.5 and about 5 μm.

16. The process as claimed in claim 15, further comprising mixing said dyestuff with a dispensing agent, wherein the dyestuff content is up to 25% by weight and the dispersion agent content is up to about 25% by weight.

17. A process for dyeing polyester or polyester-containing textile materials consisting of contacting one or more monoazo dyestuffs of the general formula I

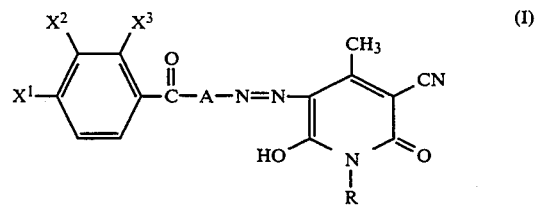

in which

A denotes 1,4-phenylene or 1,3-phenylene;

R denotes linear $(C_1-C_6)$-alkyl or $(C_1-C_4)$-alkoxy-$(C_2-C_4)$-alkyl;

$X^1$ denotes hydrogen or $(C_1-C_4)$-alkyl; and $X^2$ and $X^3$, independently of one another, denotes hydrogen or methyl; with said polyester or polyester-containing textile materials, and wherein said process is carried out in a pH range from 8 to 11 and a temperature range from 120° to 140° C.

* * * * *